(12) United States Patent
Cheng et al.

(10) Patent No.: US 7,600,136 B2
(45) Date of Patent: Oct. 6, 2009

(54) POWER MANAGEMENT IN AN INFORMATION CHANNEL

(75) Inventors: CheeWee Cheng, Singapore (SG);
KianWai Ng, Singapore (SG);
QuekLeong Choo, Singapore (SG);
Myint Muang Ngwe, Singapore (SG);
KahLiang Gan, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 350 days.

(21) Appl. No.: 11/208,317

(22) Filed: Aug. 19, 2005

(65) Prior Publication Data

US 2007/0043963 A1 Feb. 22, 2007

(51) Int. Cl.
*G06F 1/00* (2006.01)

(52) U.S. Cl. .................. 713/300; 713/310; 713/320; 713/321; 713/322; 713/323; 713/324; 713/330; 713/340

(58) Field of Classification Search .................. 713/300, 713/310, 320–324, 330, 340
See application file for complete search history.

(56) References Cited

U.S. PATENT DOCUMENTS

| 5,345,347 A | 9/1994 | Hopkins |
| 5,402,400 A | 3/1995 | Hamada |
| 5,452,277 A | 9/1995 | Bajorek |
| 5,625,826 A | 4/1997 | Atkinson |
| 5,854,720 A | 12/1998 | Shrinkle |
| 6,608,729 B1 | 8/2003 | Willems |
| 6,621,649 B1 | 9/2003 | Jiang |
| 6,622,252 B1 | 9/2003 | Klaassen |
| 6,920,002 B2 * | 7/2005 | Sako et al. ............... 360/46 |
| 6,954,321 B2 * | 10/2005 | Freitas et al. ............. 360/46 |
| 2004/0252573 A1 | 12/2004 | Hanson |

OTHER PUBLICATIONS

SR1542ABA2-YE, +3.3V/−2.1V 250Mb/s Vb/V2 20Channel Differential MR Read—TF Write Device es1642aba2 r0.3a—Rev 0.3a—Aug. 23, 2004. Texas Instruments Incorporated, 2004, pp. 1-27.
Cline, Sean, Dual-Channel VCAs: Methods for Powering Down One Channel (Application Report), Texas Instruments, Jun. 2004, pp. 1-8.

* cited by examiner

*Primary Examiner*—Abdelmoniem Elamin
(74) *Attorney, Agent, or Firm*—David K. Lucente (57) ABSTRACT

Methods and associated apparatus to reduce electrical power consumption in an information channel may include identifying times at which to restore power to elements in the information channel, and restoring power to the elements at the identified times. Times for each element are identified based on a recovery time for that element to reach a sufficiently stable operating point before a transition to an active mode of operation. By maximizing the length of time individual elements may stay in the reduced power mode, power savings may be maximized without negatively affecting information channel performance.

20 Claims, 8 Drawing Sheets

POWER MANAGEMENT IN AN INFORMATION CHANNEL

TECHNICAL FIELD

This disclosure relates to reducing electrical power consumption in electronic devices that include an information channel.

BACKGROUND

Mobile computing devices generally include portable devices that allow users to take the device to remote locations and still have the ability to access or process information. Examples of mobile devices may include hand held video recorders, digital cameras, laptop computers, hand-held computers, wearable computers, and portable music players, to name a few. Some mobile devices are capable of communicating information over networks using wireless techniques, such as infrared or radio frequency (RF) signals. In addition to communications, mobile computing devices may perform many of the same functions as non-mobile computing devices, such as powering a display device and displaying information, receiving keyboard input, processing program instructions and user input, and storing and retrieving information from data storage devices. To perform each of these functions involves supplying certain electronic components with an appropriate source of electrical power.

Electrical components, such as displays, processors, and data storage elements, may consume electrical power according to the operations they are performing. Some components can consume significant electrical power even when not performing any productive operations. One by-product of such unproductive power consumption is heat, which is often lost energy that contributes to temperature increases. Another by-product of this unproductive power consumption is an increased energy source requirement. As such, unproductive energy adds to the demands on the power source.

In a typical computing device, a power supply system furnishes the regulated voltage and/or current needed to operate all the electronic components. The power supply system often may draw energy from a source of stored energy. A common source of stored energy for mobile applications is a battery.

In a battery-powered mobile computing device, for example, unproductive power consumption may reduce available run-time. Battery run-time corresponds to how long a device can be operated using the battery as the power source. Run-time can be an important consideration, for example, for mobile computer users who rely on battery power while performing an important task. If the battery runs too low on energy to support the computing device operations, the user must find an alternate power source, such as an AC outlet or replacement battery, or discontinue using some or all of the functions of the device.

SUMMARY

Methods and associated apparatus to reduce electrical power consumption in an information channel may include identifying times at which to restore power to elements in the information channel, and restoring power to the elements at the identified times. Times for each element are identified based on a recovery time for that element to reach a sufficiently stable operating point before a transition to an active mode of operation. By maximizing the length of time individual elements may stay in the reduced power mode, power savings may be maximized without negatively affecting information channel performance.

In one exemplary embodiment, the information channel comprises a read channel in a data storage device. The read channel may include a pre-amplifier and at least one other circuit. The active mode of operation may be a read mode, during which servo wedge information may be processed by the read channel.

In various embodiments, reducing power being supplied to each of the elements in the information channel may involve removing substantially all of the power being supplied to each of the elements.

In some embodiments, the identified times may be different for each element. The identified times may be a predetermined minimum length of time required after power is restored to the element for the element to become sufficiently stable to operate within predetermined performance specifications.

In further embodiments, restoring power to each of the elements before each of the corresponding identified times may involve restoring power to each of the elements within a predetermined range of time before the identified time for each element. The predetermined range of time may be a function of a predetermined number of cycles of a clock signal, or a predetermined length of time, for example.

In one aspect, a computer program product may include instructions that, when executed on a processor, cause the processor to perform operations corresponding to the methods.

Certain embodiments may provide one or more advantages. For example, power consumption may be reduced without sacrificing performance. This may improve run-time for devices powered by stored energy elements, such as capacitors or batteries. In addition, reduced power demands may reduce thermal dissipation that may have adverse effects on product reliability. As such, energy operating costs, including the cost of recharging or replacing batteries may be saved. Moreover, reduced power dissipation may yield reductions in the cost, weight, or size of mitigation measures associated with thermal management. Furthermore, reducing the power of some circuits as long as possible may reduce the harmful effects of noise coupling, such as may occur when write channel noise couples to a read channel in a disc drive.

The details of one or more embodiments of the invention are set forth in the accompanying drawings and the description below. Other features, objects, and advantages of the invention will be apparent from the description and drawings, and from the claims.

DETAILED DESCRIPTION OF ILLUSTRATIVE EMBODIMENTS

In an electronic system, such as a computer, power consumption may be managed by reducing the power consumed by components during periods of inactivity. By selectively restoring power to the individual elements in an information channel so that each element reaches a suitable operating condition in time for the next period of activity, performance is not compromised. By tailoring the timing of the power restoration to each element such that the energy consumed by each element during the period of inactivity is minimized, power savings can be maximized without impacting the performance.

Figure 1:
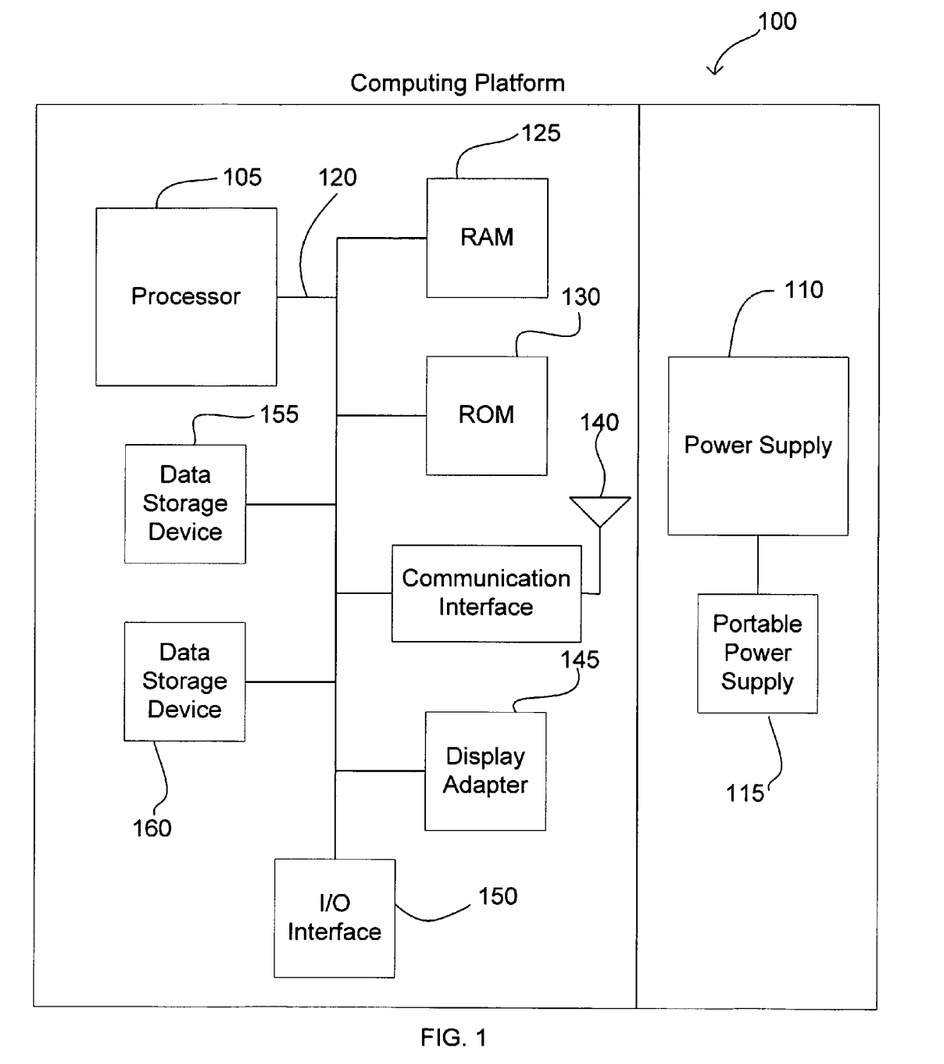
FIG. 1 is a diagram of an exemplary computing platform.

In FIG. 1, one embodiment of a system in which power savings may be realized includes an exemplary mobile computing platform 100, which may be, for example, a laptop, a handheld computer, or a portable digital assistant with cellular telephone capability. The platform 100 includes a processing unit 105 that performs certain pre-programmed functions. The platform 100 also includes a power supply 110 that receives power from a mobile power source 115, such as a battery pack, and may alternately receive power from an external source (not shown). The power supply 110 provides and distributes regulated voltage and/or current suitable to operate electronic and electromechanical elements on the platform 100. The processing unit 105 is connected by one or more signals forming an information bus 120 to a volatile memory (e.g., RAM) 125, a non-volatile memory (e.g., ROM) 130, a communication interface 135, an antenna 140, a display adapter 145, an input/output interface 150, and data storage devices 155, 160.

The basic operation of each of these elements will not be described in detail, as they are well understood by those familiar with computer system architecture. The volatile memory 125 may include, for example, memory for data that is used by the processing unit, but may be lost if power is removed. The non-volatile memory 130 may contain, for example, programming instructions, including boot code, that is generally retained when power is removed. Certain elements, such as the antenna 140, are optionally used to provide a wireless connection to a network, and may be selectively removable by the user. The antenna 140 is one embodiment of a communication interface that may be used to connect to a network, such as an intranet, VPN, or the Internet. The display adapter 145 receives display command signals and generates appropriate signals for display on a display device (not shown), such as a CRT display, flat panel display, or similar display device. The I/O interface 150 may receive signals from input devices, such as a keyboard, keypad, touch screen, microphone, pointing device (e.g., mouse), or similar device, and forward the command signals in the appropriate format to the processor 105.

The communication interface 135 of this example includes an antenna 140 that can support wireless communication using various wireless protocols or techniques. By way of example, such wireless protocols or techniques may include versions of Wi-Fi (802.11 (a, b, g, or n)), 802.16, GSM, UMTS, wireless local area network (WLAN), wideband wide area network (WWAN), code division multiple access (CDMA), or orthogonal frequency division multiplexing (OFDM). The communication interface 135 may have components capable of sending and receiving signals that contain encoded information suitable for data transmission. Receiving and transmitting circuits (not shown) may comprise an information channel coupled to a physical transducer. In one embodiment, the transducer may comprise the antenna 140 to transfer electrical voltage and current signals to radio frequency (RF) signals in the form of electromagnetic waves that propagate through the atmosphere. In another embodiment, the transducer may comprise an optical transmitter/receiver element capable of sending or receiving optical data signals in the form of modulated light propagating through the atmosphere or a fiber optic cable. In yet another embodiment, the transducer may send or receive modulated sound signals, similar to a facsimile machine. In still other embodiments, a conductor may physically connect the communication interface 135 to a remote communication node, thereby providing wired connectivity for data communication. The communication interface 135 may include well understood support for appropriate physical layer or transport layer requirements, such as signal filtering, proper signal levels, data rates, encoding schemes, error detection and correction information, and packet header information, or other information or meta-information, as appropriate.

In this example, two data storage devices 155, 160 may store information on, for example, magnetic or optical media. For example, the processor 105 may send data to one of the data storage devices 155, 160 for storage, and it may retrieve data as needed. In various embodiments, the data storage devices 155, 160 may be selected from among of a number of data storage device types. Examples include: floppy disc drives, hard disc drives, optical drives, CD-ROM, CD-R/W drives, tape drives, cassette drives, and similar storage devices. Exemplary embodiments in a data storage device are discussed in more detail below.

Figure 2:
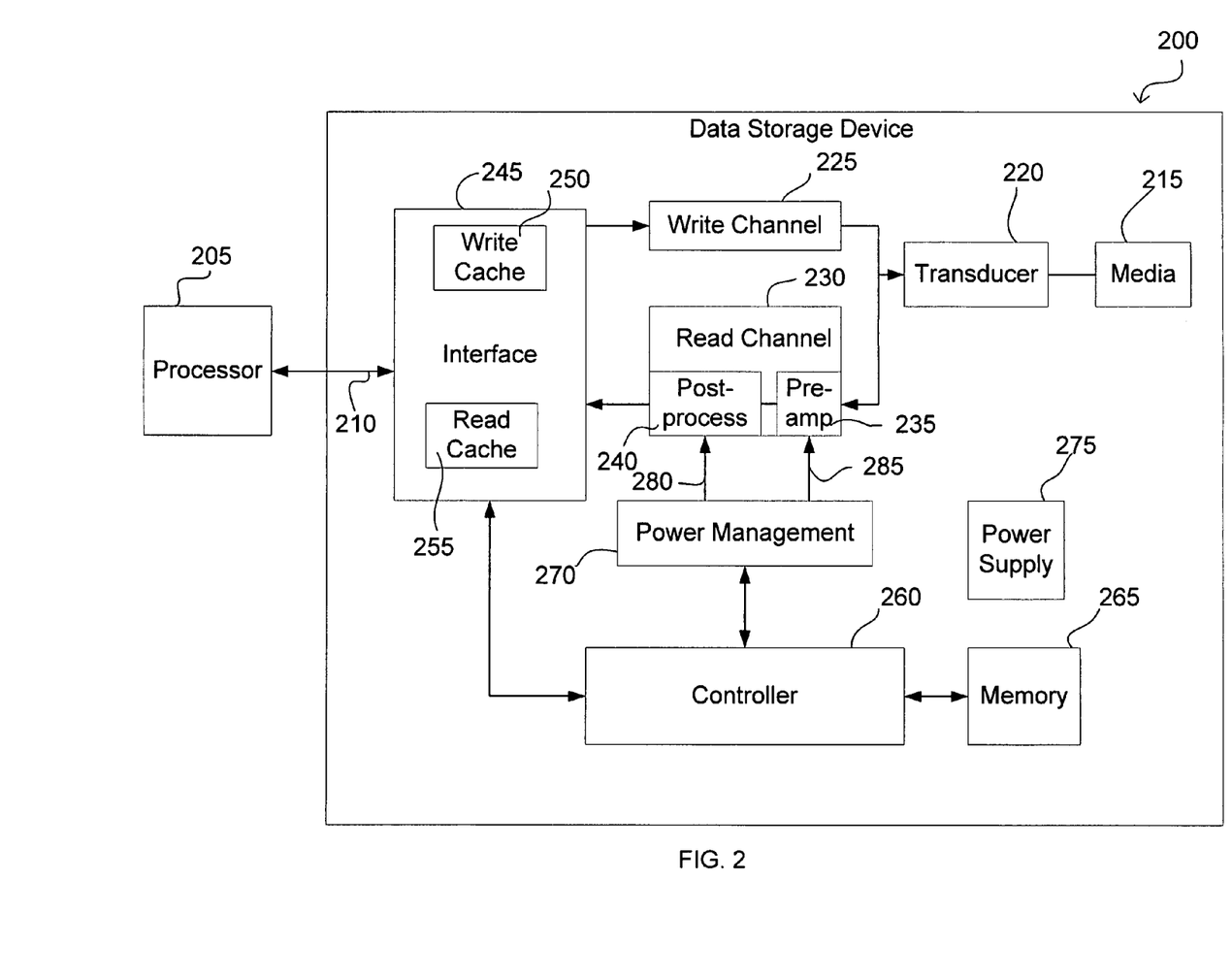
FIG. 2 is a block diagram of an exemplary data storage device.

Either one of the data storage devices 155, 160 may be represented in further pertinent detail by an exemplary data storage device 200 as shown in FIG. 2. The data storage device 200 couples to a processing unit 205 via a bus 210. The processing unit 205 may, in some embodiments, correspond to the processing unit 105 in FIG. 1. The device 200 includes a medium 215 on which data can be stored by a writing process and retrieved by a reading process. The device 200 performs these writing and reading processes in response to commands received from the processing unit 205 over the bus 210. In response to a write command, the device 200 receives the data to be written from the processing unit 205 (or a proxy thereof) in association with a write command, and is subsequently recorded in the appropriate media format to the media 215 by a transducer 220. In response to a read command, data to be read is retrieved by the transducer 220 from the appropriate location on the media 215, and is subsequently sent to the processing unit.

The transducer 220 may comprise one or more separate elements for reading and writing. The transducer 220 may comprise, in one embodiment, a write head and a read head (not shown) that are configured to interface with the storage media type (e.g., magnetic or optical). Data may be received, via the bus 210, from a host processor by an interface 245 that includes a write cache memory 250 and a read cache memory 255. Data to be stored on the storage media 215 may be transferred from the write cache memory 250 to a write channel 225. The write cache memory 250 may be used to optimize the data transfer. The write channel 225 processes the data into signals to be sent to the transducer 220 for storing to the media 215.

For data retrieval, the transducer 220 senses the stored data from the media 215 and transmits an electrical signal to a read channel 230, which processes signals from the transducer to retrieve recorded information. The read channel 230 has circuitry for processing the signal, including a pre-amp circuit 235 and a post-process circuit 240. The pre-amp circuit 235 and post-process circuit 240 filter and amplify the signal as it propagates through the read channel 230. The read channel 230 sends the data to the interface 245, where it may be stored in the read cache memory 255. For simplicity, signal processing elements, such as steps relating to digitization of the signal, are not shown. Using the bus 210, the interface 245 sends the data via the bus 210.

The interface 245 communicates data transfer status information to a controller 260. The controller 260 may perform various supervisory and control functions related to the operation of the read channel 230 and the write channel 225. As such, the controller may include a microprocessor, internal memory, signal processing hardware, and software. In this example, the controller 260 is coupled to a memory 265 that may store instructions to be executed by the controller 260. In one embodiment, the stored instructions cause the controller to perform operations to supervise a power management algorithm for the read channel 225. Exemplary power management algorithms are described, for example, with reference to FIG. 5.

The controller 260 may communicate the state of the power management algorithm to a power management circuit 270 that generates control signals to manage the power consumption of the read channel 230. The power management circuit 270 is connected to the read channel post-process circuit 240 via a bus 280 and to the read channel pre-amp circuit 235 via a bus 285. The circuits 235, 230 may be supplied power from a power supply 275.

In an embodiment, the controller 260 may be integrated with the power management circuit 270. In various embodiments, the data storage device 200 may be implemented with a combination of analog and digital electronics, including discrete and/or integrated components, and may further include one or more components configured to execute instructions.

Figure 3:
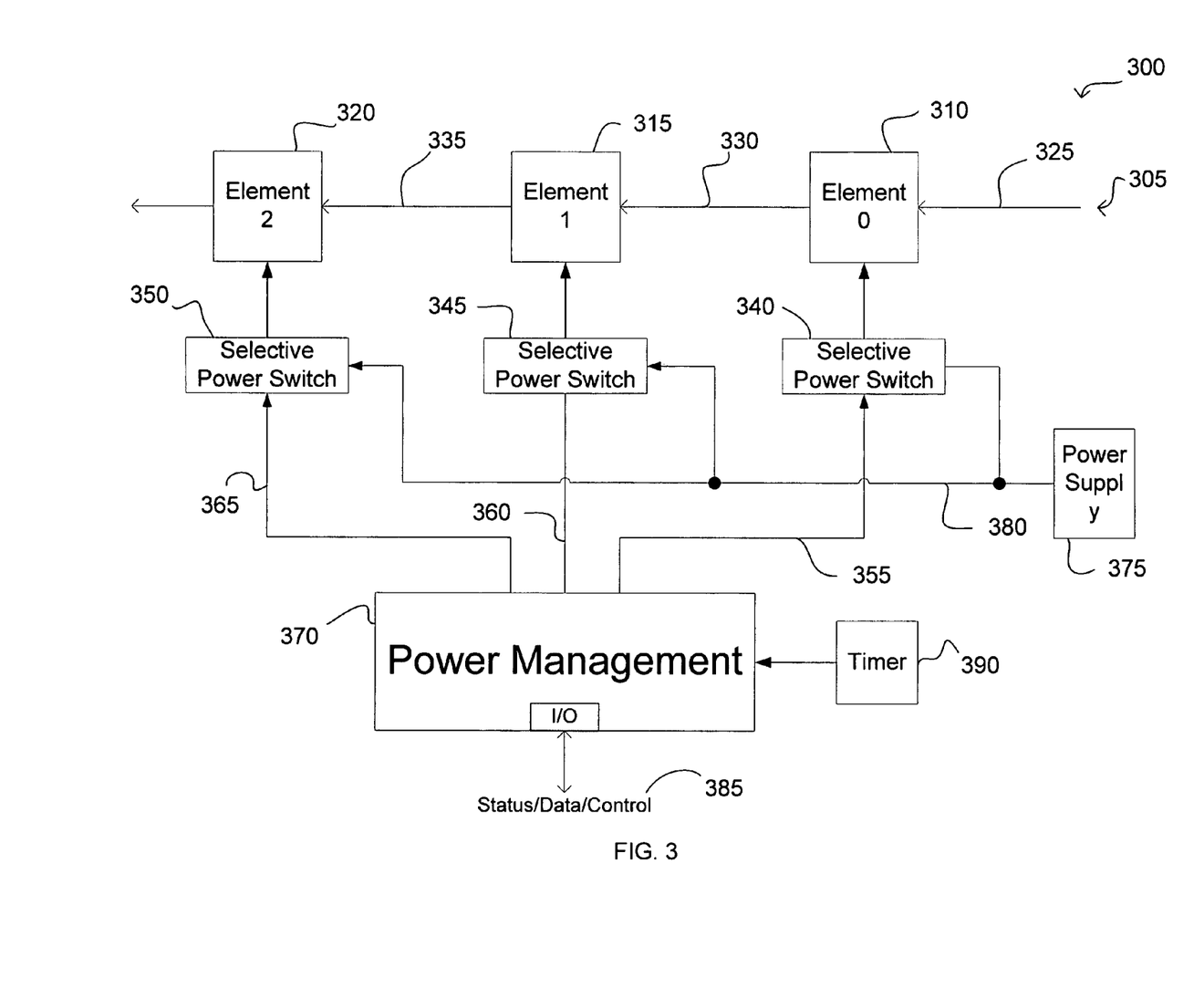
FIG. 3 is a block diagram of an information channel.

The read channel 230 is one embodiment of an information channel that may process signals in a system. FIG. 3 shows an embodiment of a system 300 that includes an exemplary information channel 305. In this example, the information channel 305 may perform the signal processing functions corresponding to the read channel 230 of FIG. 2.

The information channel 305 includes an Element_0 310, an Element_1 315, and an Element_2 that are connected in series. An input signal received at a node 325 may be processed by the elements 310, 315, 320, in sequence, to perform a desired signal processing function. In this example, Element_0 310 receives an input signal on the node 325. After processing (e.g., amplification) by the Element_0 310, the signal is output on a node 330 to be received by the Element_1 315. The signal is processed (e.g., filtered) by Element_1 315 and output onto node 335 to be received by Element_2 320 (e.g., filter with gain). Element_2 320 outputs the signal for further processing.

Each element 310, 315, 320 may be, for example, a circuit or other signal processing element that may receive reduced electrical power in certain operating modes of the information channel 305. In this example, the elements 310, 315, 320 are each coupled to a selective power switch element 340, 345, 350, respectively. Electrical power is supplied to the selective elements 340, 345, 350 by a power supply 375 via the common power supply bus 380.

In some embodiments, the selective power switch elements 340, 345, 350 may be power switches, solid state relays, multiplexers, or other device capable of reducing the power delivered to the corresponding element. Each of the selective power switch elements 340, 345, 350 may selectively reduce or restore power being supplied to each of the elements 310-320, respectively. In some implementations, the selective power switch elements 340, 345, 350 may be coupled to interrupt a low impedance connection between a voltage rail of the power supply 375 and at least one power-consuming circuit in one of the elements 310-320. In other implementations, the selective power switch elements 340, 345, 350 may be coupled to cause at least a portion of one of the elements 310-320 to transition to a low-power consumption state, whereby only low-level bias currents are flowing, for example.

In response to control signals 355-365 from the power management element 370, each selective power switch elements 340-350 controls the electrical power consumption of the elements 310-320 in the information channel 300. The control signals 355-365 generated by the power management element 370 control the timing of restoration and reduction of power to each of the respective elements 310-320. The power management element 370 controls when each of the elements 310-320 may be put into a reduced power consumption state, and when they need to be restored to a normal operating state. The power management element responds to inputs that, in this example, include timing information received from the timer 390 and signals on a Status/Data/Control bus 385, which may be generated by the controller 260 of FIG. 2, for example.

In an alternative example, the elements 310-320 of the information channel 305 may be interconnected in a combination of serial or parallel configurations. Some systems may have information channels that have two elements, and others may include four or more elements. In some embodiments, each element of the information channel 305 may include discrete or integrated circuitry, which may be analog and/or digital, or a combination thereof. Each element may incorporate a programmable device programmed to perform operations by executing instructions stored in a memory, for example.

Referring back to the exemplary data storage device 200 of FIG. 2, the pre-amp 235 may be disposed on a movable arm that supports the transducer 220. As such, the pre-amp 235 can amplify read signals for transmission through a wiring assembly to downstream elements in the read channel 230, such as the post-processing elements 240. One implementation of the pre-amp 235 is represented by an exemplary pre-amp circuit 400 in FIG. 4.

Figure 4:
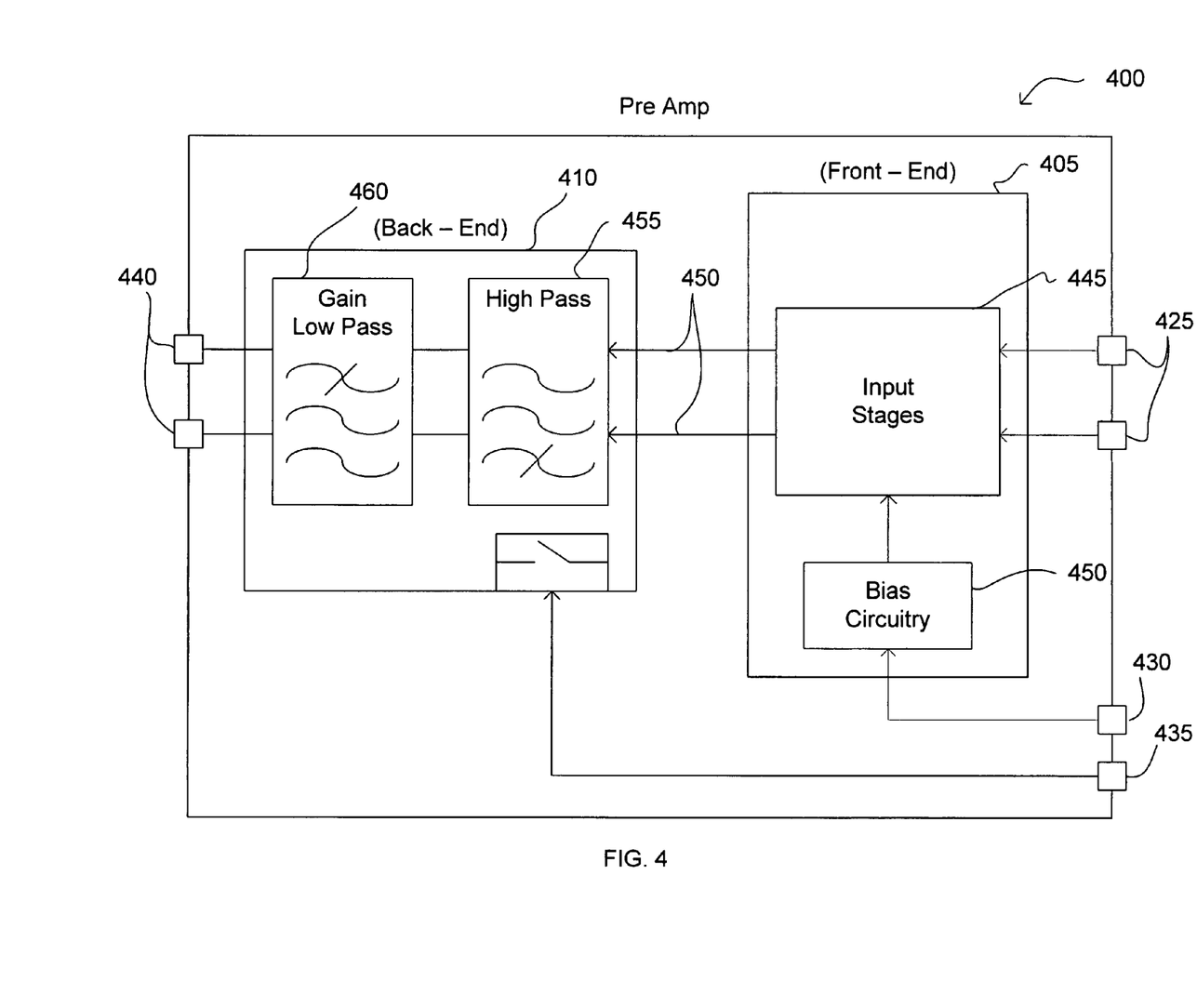
FIG. 4 is a block diagram of one embodiment of a read channel circuit in an exemplary data storage device.

The pre-amp 400 includes a front-end circuit 405 and a back-end circuit 410 that together form an information channel. A differential input signal received at an input node 425 may be processed by the front-end circuit 405 and the back-end circuit 415. The front-end circuit 405 includes input stages 445 and bias circuitry 450. During normal operation, the front-end circuit 405 receives an input signal present on the input node 425, then the signal is processed by the back-end circuit 410 and output on an interconnect node 440. In this example, the back-end circuit 410 includes a high pass filter 455 and a gain boost low pass filter 460.

The pre-amp receives power mode input control signals for the front-end circuit 405 and the back-end circuit 410 from a power management element, for example, the power management circuit 270 of FIG. 2. The power management element sends an output control signal (e.g., output control line 285 in FIG. 2) to input 430 to control the restoration and reduction of power of the front-end circuit 405. The power management element sends an output control signal (e.g., output control line 280 in FIG. 2) to input 435 to control the restoration and reduction of power of the back-end circuit 410.

For the exemplary pre-amp 400 operating in a data storage device, power savings may be realized by reducing power to elements in the read channel while write operations are occurring. When a read operation is required, power must be restored to the elements in the read channel sufficiently in advance of the time when read signals are to be processed so that each element has reached a stable operating point by the time that element begins to process signals that represent data to be read. To maximize power savings, power to individual elements in the read channel may be held in the reduced state as long as practicable, based on the recovery time needed for each individual element to reach a stable operating point after power to the element has been restored.

According to one embodiment, the front-end circuit 405 and the back-end circuit 410 of the read channel 400 may be brought out of power saving mode in response to the control signals 430 and 435, respectively, at times calculated to minimize unnecessary power consumption. The pre-amp 400 may transition from a write mode to a read mode, for example, to process a series of read and write commands. In the example of a disc drive, read commands may periodically be issued during a long write operation in order to read data stored on the media in what are called servo wedges. If the pre-amp 400 is operated in a reduced power mode during write operations, power must be restored to elements of the pre-amp 400 some time in advance of reading each servo wedge.

In one illustrative example, a streaming download continuously operates to store data in successive write operations, interrupted periodically to read servo wedge data, which occurs approximately every 90 microseconds. The front-end and back-end circuits 405, 410 respond to enabling signals on nodes 430, 435 by recovering from power save mode in 200 nsec and 10 microseconds, respectively. When each write operation begins, the front-end and back-end circuits 405, 410 are put into reduced power (i.e. power save) mode by applying disabling signals to the nodes 430, 435. To ensure proper reading of the servo wedge data while minimizing power consumption of the read channel, an enabling signal is applied to the node 435 approximately 10 microseconds before the next servo wedge (read) operation. To maximize power savings, the front-end circuit 405 remains in a reduced power mode until an enabling signal is applied to the node 430 approximately 200 nsec before the next servo wedge (read) operation. In this manner, the power consumption of each element is reduced when not necessary to support the active operation of the information channel.

Figure 5:
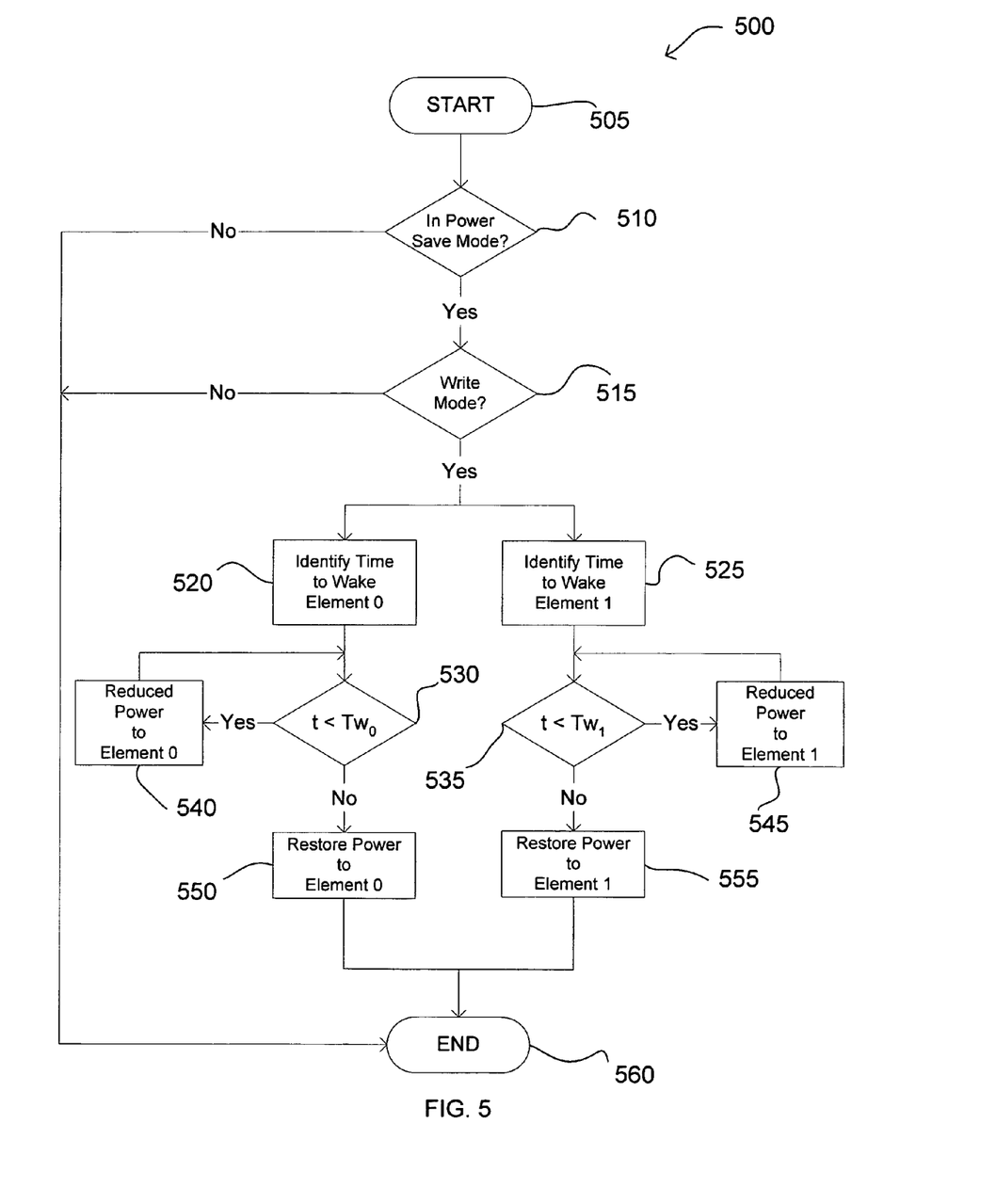
FIG. 5 is a flowchart diagram of a method for reducing power consumption in an information channel.

According to one embodiment, the system 300 of FIG. 3 may be operated to perform power management of an information channel that has two independently controlled elements by performing steps of an exemplary method 500 shown in FIG. 5. Beginning at step 505, a check is first made at step 510 to determine if the information channel is in a power save mode. If the information channel is not in the power save mode, then the method terminates at step 560. If the information channel is in the power save mode, then the method 500 proceeds to step 515 to determine if the information channel is in the write mode. If the information channel 300 is not in the write mode, then the method terminates at step 560. If the information channel is in the write mode, parallel operations for each of the two elements of this example begin at steps 520 and 525. Although steps 520, 525 correspond to two elements in the exemplary information channel, additional parallel elements may be added to the method to provide power savings to an information channel having three or more elements. In each case, the corresponding steps may be performed, for example, by a single controller or processor executing steps substantially in parallel.

In step 520 and step 525, the power management element 370 determines the times to wake for each element (i.e., Tw0 and Tw1), which are the times when power must be restored to each element_0 310 and element_1 315 so that each element can recover from power saving mode before the next read mode operation begins. The time that it takes for element_0 310 and element_1 315 to recover from power saving mode (i.e. reach a sufficiently stable operating point to process signals within specifications) may be referred to as the recovery time for each element (Rx). The Tw0 and Tw1, respectively, are determined by subtracting the recovery time Rx0, Rx1 from the anticipated time of the next read operation. In steps 530, 535, the power management element 370 runs a continuous loop to independently compare Tw0 and Tw1 to the present time t. As long as either Tw0 or Tw1 are greater than t, the power management element 370 independently may maintain the corresponding element_0 310 and element_1 315 in reduced power mode at steps 540, 545.

When t approaches Tw0, the method 500 transitions from step 530 to step 550. When t approaches Tw1, the method 500 transitions from step 535 to step 555. In some embodiments, a timing margin (e.g., a predetermined number of processor clock cycles) may be introduced so that the effective transition from step 530 to 550 or from 535 to 555 may occur when the present time t falls within a window of time that begins in advance of Tw0 or Tw1 by the selected timing margin. The timing margin may be selected to ensure that that processor has sufficient time to execute instructions to accomplish the transitions before Tw0 or Tw1. In steps 550, 555, the elements 310, 315 exit their respective power save modes and have power restored in preparation for the upcoming read operation. Since Tw0 and Tw1 differ in this example, element_0 310 and element_1 315 will have power restored at different points in time. Once both elements 310, 315 have had power restored, the method 500 ends at step 560.

Figure 6:
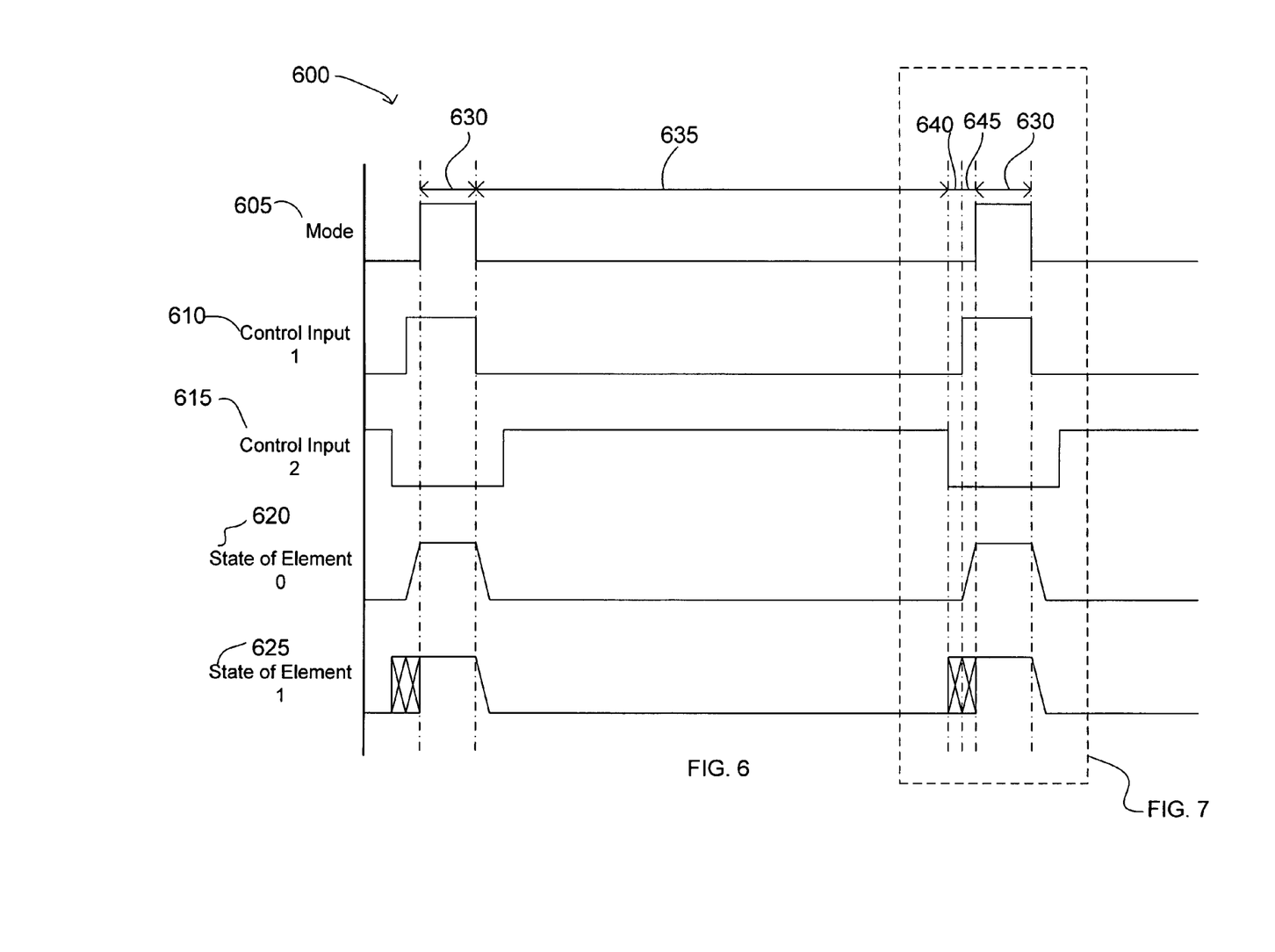
FIG. 6 is a timing diagram of a read/write sequence.
Figure 7:
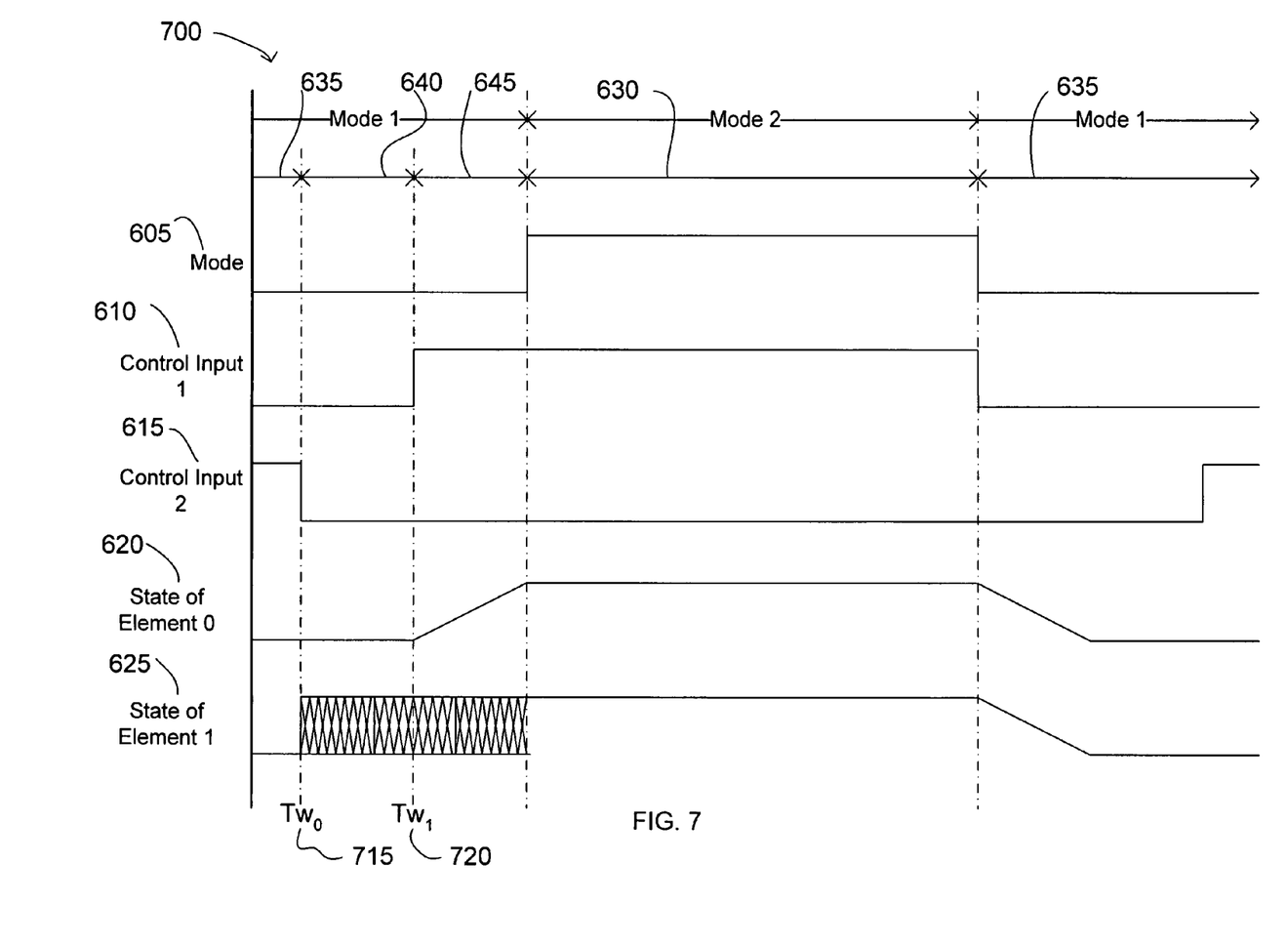
FIG. 7 is a timing diagram of a portion of the read/write sequence of FIG. 6.

The method described by the flowchart of FIG. 5 may be implemented by the power management element 370 of FIG. 3 to provide the signals depicted in the exemplary timing diagrams 600 and 700 of FIGS. 6 and 7. In FIG. 6, the timing diagram 600 illustrates an entire read/write cycle that may be executed by the data storage device 300 of FIG. 3. The timing diagram 700 in FIG. 7 illustrates in greater detail the timing of the transition of the write-to-read recovery performed according to the method 500, described above.

In this example, the timing diagram 600 includes a mode signal 605, control input signal_1 610, control input signal_2 615, state of element_0 signal 620, and state of element_1 signal 625, which may correspond to the operating states of the elements 310, 315 of FIG. 3. In a data storage device, for example, the mode waveform 605 may correspond to the state of a servo gate signal that indicates the reading of a servo wedge. The control input signal_1 610 may correspond to the state of the Read/Write control line, which in one example may be connected to the node 430, and the control input signal_2 615 may correspond to the state of a second control signal, such as the one connected to the node 435 of FIG. 4. The state of Element_0 620 may correspond to the state of the front-end circuit 405, and the state of Element_1 625 may correspond to the state of the read backend circuit 410.

The timing diagram 600 illustrates one cycle of an exemplary read/write cycle by showing four separate time periods 630, 635, 640, and 645. Time period 630 identifies the time period in which the storage device 200 is in the read mode. During time periods 635, 640, 645, the storage device 200 is in either the write mode or in transition from write to read mode. During time period 635, the storage device 200 is the write mode and element_0 310 and element_1 315 are in a reduced power mode. During time period 640, the power management circuitry 270 has determined that the time remaining until the next read operation is sufficiently short that power to element_1 315 should be restored in order for the Element_1 315 to reach a stable operating point in time to process signals during the next read operation. During time period 645, the power management circuitry 270 has determined that the time remaining until the next read operation is such that power to element_0 310 should be restored in order for the Element_0 310 to reach a stable operating point in time to process signals during the next read operation. After time period 645, the data storage device returns to read mode during time period 630.

Referring to FIG. 7, the transition between the write mode during time period 635 and the read mode during time period 630, which includes time periods 640 and 645, is shown in greater detail in timing diagram 700. The transition timing diagram 700 illustrates, in one example, times at which power should be restored to each of element_0 620 and element_1 625 so that each element will reach its respective sufficiently stable operating point when the storage device 300 transitions from a Mode_1 (e.g., write mode) to a Mode_2 (e.g., read mode). These times are denoted as Tw0 715 and Tw1 720, respectively. The timing diagram 700 shows that Element_1 315 begins the recovery from power save mode when t=Tw1, and that Element_0 310 begins the recovery from power save mode when t=Tw0.

The timing of the control signals 610, 625 need not be exact to achieve substantial performance advantages. For example, power savings may be achieved for Element_0 if the control signal 355 changes state to restore power to that element at a time substantially approximate to Tw0 715. In some embodiments, the timing of the control signal 355 may includes a margin of safety, and/or a window of time, in advance of Tw0 715.

Figure 8:
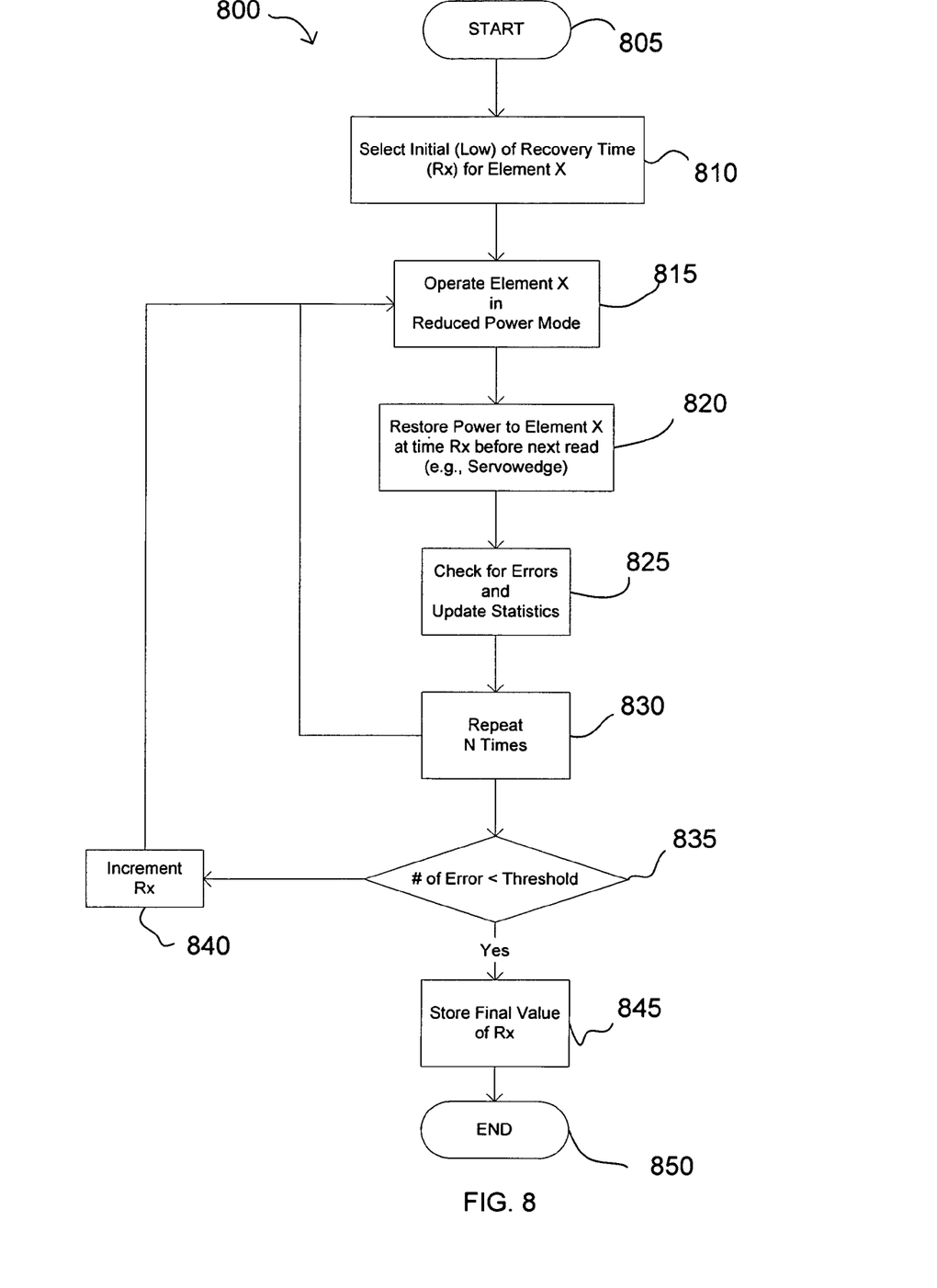
FIG. 8 is a flowchart of a method to identify recovery time parameters for elements of an information channel.

In one illustrative embodiment, the recovery time for an element (Rx), as used in step 520, 525 of FIG. 5, for example, may be determined according to an exemplary method 800 shown in FIG. 8. The method 800 may be performed, for example, by the system 300 of FIG. 3 to identify or determine the element recovery times (Rx), which can be used to calculate timing values Tw0 715 and Tw1 720 (as described above). In various embodiments, the method 800 may be performed one or more times during the life of a product that includes an information channel. For example, the method 800 may be performed as an end of line test during system manufacture, or on a pre-scheduled basis to maintain accurate parameters over the life and operating conditions.

The method 800 begins at step 805 during a period of time in which the information channel is free to perform a self test. An initial low value for Rx is selected, at step 810, for a single selected element (Element X). The initial value for Rx is intentionally low enough to cause performance errors. Step 815 involves operating the selected element (e.g., element_1 315) in reduced power mode. In Step 820, power is restored to the element at time Rx=5 uS prior to the next read operation (e.g., servo wedge). Once the element has performed the read operation, the information system 300 checks for data errors and updates statistics in step 825. At step 830, the steps 815-825 are repeated a predetermined number of times, N. Then, at step 835, the system 300 compares the number of errors to a predetermined error threshold. If the number of errors is greater than the error threshold, the system 300 increments the value of Rx at step 840. For example, the recovery time parameter value for the element_1 315 may be incremented. Then, steps 815-835 are repeated and incremented at step 840 until the number of errors calculated in step 835 is less than the predetermined error threshold.

If, at step 835, the number of errors is less than the predetermined error threshold, then the final value for recovery time Rx is stored at step 845. In this example, the stored final value, R0, may then be used by the system 300 to determine Tw0 715 by subtracting R0 from the time of the next read operation. In some examples, that calculation may include adjustments to provide design margin.

The method 800 may be performed to identify the recovery time for different elements in the information channel, and the method may be repeated as necessary over the life of the information channel.

In alternative embodiments to the examples described herein, the methods and apparatus may be modified as appropriate to the achieve similar results, for example, by modifying the order, sequence, numbers of events, steps, or elements described. Other embodiments may include additional functionality and features, or may be combined in different ways to achieve similar advantages.

In an embodiment, power may be restored to an individual element at, or approximately at, a time Tw(n), to ensure that the element will have recovered in time to process signals in the next mode of operation. Each element may have a different value for Tw such that power to elements in the information channel may be restored at up to N different values of Tw(n).

To provide a safe design margin, some embodiments may restore power to each element a certain amount of time in advance of Tw(n). For example, some embodiments may generate a signal that initiates power restoration to a particular element in the channel at least a predetermined time in advance of Tw(n). In other embodiments, power may be restored within a predetermined window of time in advance of Tw(n). In embodiments having a clocked digital system, for example, power may be restored to a particular element a predetermined number of clock cycles (or fractional cycles) in advance of Tw(n). Depending on the clock period, software timing, and other timing parameters, power may be restored at or approximately at $\frac{1}{4}$, $\frac{1}{2}$, 1, 5, 10, or 100 clock periods in advance of Tw(n).

Although the platform 100 of FIG. 1 is described, for purposes of illustration, as a mobile computing platform, embodiments may alternatively include, for example, desktop computers, workstations, servers, embedded systems, industrial controllers, external or internal computing peripherals, or sub-systems, such as a network interface card, of such platforms.

A number of embodiments of the invention have been described. Nevertheless, it will be understood that various modifications may be made without departing from the spirit and scope of the invention. For example, the number of elements in the information channel may be any practical number more than 2, and a corresponding number of control signals may be generated to control the timing of restoration of power to minimize power consumption. In addition, some elements may have more than one mechanism for reducing power, and more than one corresponding recovery times that may be selectively controlled to minimize power consumption. Accordingly, other embodiments are within the scope of the following claims.

What is claimed is:

1. A method, comprising:
    reducing electrical power being consumed by each of two or more power-consuming elements in an information channel when the information channel is in a first mode of operation;

identifying, separately for each element, a time at which power must be restored to that element for that element to reach a sufficiently stable operating point before a transition to a second mode of operation; and restoring power to each element at or approximately at the corresponding identified time.

2. The method of claim 1, wherein the first mode of operation comprises a power saving mode.

3. The method of claim 2, wherein the information channel comprises a read channel in a data storage device.

4. The method of claim 3, wherein the second mode of operation comprises a read mode.

5. The method of claim 4, further comprising servo wedge information in the information channel during the second mode of operation.

6. The method of claim 4, wherein the information channel comprises a pre amplifier.

7. The method of claim 6, wherein a first one of the elements comprises a first circuit in the pre-amplifier to process a signal received by the pre-amplifier.

8. The method of claim 6, wherein a second one of the elements comprises a second circuit to process signals output by the first circuit.

9. The method of claim 1, wherein identifying, for each element, a time at which to restore power comprises identifying, for each element, a predetermined minimum length of time required after power is restored to the element for the element to become sufficiently stable to operate within predetermined performance specifications.

10. The method of claim 1, wherein restoring power to each of the elements before each of the corresponding identified times comprises restoring power to each of the elements within a predetermined range of time before the identified time to restore power to each element.

11. The method of claim 1, wherein reducing the power being supplied to each of the elements in the channel comprises removing substantially all of the power being supplied to each of the elements.

12. The method of claim 11, wherein the predetermined range of time comprises a function of a predetermined number of cycles of a clock signal.

13. The method of claim 11, wherein the predetermined range of time comprises a predetermined length of time.

14. The method of claim 1, wherein the identified times for each element are different.

15. A method, comprising:

reducing electrical power being consumed by each of two or more power-consuming elements in an information channel when the information channel is in a power save mode of operation by removing substantially all of the power being supplied to each of the elements;

identifying, separately for each element, a time at which power must be restored to that element for that element to reach a sufficiently stable operating point before a transition to an active mode of operation, wherein the identified times for each element are different; and restoring power to each element at or approximately at the corresponding identified time.

16. The method of claim 15, wherein the active mode of operation comprises a read mode.

17. The method of claim 15, wherein at least one element in the information channel comprises an amplifier.

18. The method of claim 15, wherein restoring power to each of the elements before each of the corresponding identified times comprises restoring power to each of the elements within a predetermined range of time before each said identified time.

19. The method of claim 11, wherein the predetermined range of time comprises a function of a predetermined number of cycles of a clock signal.

20. A computer-readable medium comprising instructions that, when executed by a processor, cause the processor to:

reduce electrical power being consumed by each of two or more power-consuming elements in an information channel when the information channel is in a first mode of operation;

identify, separately for each element, a time at which power must be restored to that element for that element to reach a sufficiently stable operating point before a transition to a second mode of operation; and restore power to each element at or approximately at the corresponding identified time.

* * * * *

UNITED STATES PATENT AND TRADEMARK OFFICE
CERTIFICATE OF CORRECTION

| | |
|---|---|
| PATENT NO. | : 7,600,136 B2 |
| APPLICATION NO. | : 11/208317 |
| DATED | : October 6, 2009 |
| INVENTOR(S) | : Cheng et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 761 days.

Signed and Sealed this

Fifth Day of October, 2010

David J. Kappos
*Director of the United States Patent and Trademark Office*